United States Patent
Stambaugh

(10) Patent No.: US 7,353,208 B1
(45) Date of Patent: Apr. 1, 2008

(54) TRANSACTION PROCESSING USING INTERMEDIATE SERVER ARCHITECTURE

(75) Inventor: Rod Stambaugh, Mill Valley, CA (US)

(73) Assignee: Transaction Network Services, Inc., Reston, VA (US)

( * ) Notice: Subject to any disclaimer, the term of this patent is extended or adjusted under 35 U.S.C. 154(b) by 0 days.

(21) Appl. No.: 09/495,898

(22) Filed: Feb. 2, 2000

(51) Int. Cl.
G06Q 30/00 (2006.01)
G06Q 20/00 (2006.01)
G06K 9/00 (2006.01)
G06K 9/62 (2006.01)
G07C 9/00 (2006.01)

(52) U.S. Cl. .................. 705/59; 705/50; 705/51; 705/52; 705/53; 705/54; 705/55; 705/56; 705/57; 705/58; 705/39; 705/26; 705/35; 380/23; 380/24; 380/25; 380/49

(58) Field of Classification Search ............ 705/50–59; 380/20–25
See application file for complete search history.

(56) References Cited

U.S. PATENT DOCUMENTS

| | | | |
|---|---|---|---|
| 4,412,292 A | 10/1983 | Sedam et al. | 364/479 |
| 4,570,228 A | 2/1986 | Ahlberg | 364/467 |
| 4,650,978 A | 3/1987 | Hudson et al. | 235/380 |
| 4,766,548 A | 8/1988 | Cedrone et al. | 364/479 |
| 5,208,446 A | 5/1993 | Martinez | 235/380 |
| 5,387,784 A | 2/1995 | Sarradin | |
| 5,408,513 A | 4/1995 | Busch, Jr. et al. | 379/59 |
| 5,532,689 A | 7/1996 | Bueno | 340/928 |
| 5,541,925 A | 7/1996 | Pittenger et al. | 370/94.1 |
| 5,572,004 A | 11/1996 | Raimann | 235/380 |
| 5,619,024 A | 4/1997 | Kolls | 235/381 |
| 5,637,845 A | 6/1997 | Kolls | 235/381 |
| 5,678,010 A | 10/1997 | Pittenger et al. | |
| 5,696,909 A | 12/1997 | Wallner | 395/244 |
| 5,862,183 A | 1/1999 | Lazaridis et al. | 375/295 |
| 5,870,723 A * | 2/1999 | Pare et al. | 705/39 |
| 5,920,847 A * | 7/1999 | Kolling et al. | 705/40 |
| 5,930,767 A * | 7/1999 | Reber et al. | 705/26 |
| 5,930,771 A | 7/1999 | Stapp | 705/28 |
| 5,991,410 A | 11/1999 | Albert et al. | |
| 6,061,557 A | 5/2000 | Lazaridis et al. | 455/406 |

(Continued)

FOREIGN PATENT DOCUMENTS

GB  2143981 A  2/1985

OTHER PUBLICATIONS

EP Search Report dated Feb. 7, 2006 corresponding to EP 00982148.9.

Primary Examiner—Kambiz Abdi
Assistant Examiner—Cristina Owen Sherr
(74) Attorney, Agent, or Firm—Mintz, Levin, Cohn, Ferris, Glovsky and Popeo PC

(57) ABSTRACT

A system and method of transaction processing is provided and includes a transaction terminal accessing a communications network. The transaction terminal sends first transaction information for a transaction across the communications network to a server. The first transaction information, which may include an account number and a transaction amount, is received and processed at the server communicating with the communications network. At least a portion of the first transaction information is stored and made accessible via the Internet. The server sends second transaction information based on the first transaction information to a transaction processor.

18 Claims, 4 Drawing Sheets

U.S. PATENT DOCUMENTS

| | | |
|---|---|---|
| 6,067,527 A | 5/2000 | Lovell et al. |
| 6,075,796 A * | 6/2000 | Katseff et al. ............... 370/466 |
| 6,078,806 A | 6/2000 | Heinonen et al. |
| 6,088,730 A | 7/2000 | Kato et al. ................... 709/227 |
| 6,119,934 A | 9/2000 | Kolls ......................... 235/381 |
| 6,181,981 B1 | 1/2001 | Varga et al. ................. 700/236 |
| 6,216,015 B1 | 4/2001 | Hymel |
| 6,286,099 B1 * | 9/2001 | Kramer ....................... 713/172 |
| 6,339,731 B1 | 1/2002 | Morris et al. ................ 700/236 |
| 6,347,739 B1 | 2/2002 | Tamam ........................ 235/384 |
| 2001/0044293 A1 | 11/2001 | Morgan |

* cited by examiner

FIG. 4

| Transaction Type | Count | Total |
|---|---|---|
| Purchases | 16 | $344.14 |
| Returns | 2 | $60.80 |
| Grand Total | 18 | $288.34 |

Transactions on 8/12/1999

| Transaction | Account | Amount | Approval Code | Date | Time | Entry Method | Card Type |
|---|---|---|---|---|---|---|---|
| Purchase | 4123****2349 | $32.00 | APPROVAL 232173 | 08/12/99 | 15:17:03 | Track 2 | Visa |
| Purchase | 4123****2349 | $12.00 | APPROVAL 232081 | 08/12/99 | 15:16:35 | Track 2 | Visa |
| Purchase | 4123****2349 | $12.00 | APPROVAL 231954 | 08/12/99 | 15:15:56 | Track 2 | Visa |
| Purchase | 4123****2349 | $6.32 | APPROVAL 224658 | 08/12/99 | 14:38:42 | Track 2 | Visa |
| Purchase | 4123****2349 | $9.60 | APPROVAL 224374 | 08/12/99 | 14:37:15 | Track 2 | Visa |
| Purchase | 4123****2349 | $8.00 | APPROVAL 224165 | 08/12/99 | 14:36:11 | Track 2 | Visa |
| Purchase | 4123****2349 | $8.00 | APPROVAL 224146 | 08/12/99 | 14:36:05 | Track 2 | Visa |
| Return | 4123****2349 | $54.00 | APPROVAL | 08/12/99 | 9:11:02 | Track 2 | Visa |
| Purchase | 4123****2349 | $108.00 | APPROVAL 25827 | 08/12/99 | 09:10:11 | Track 2 | Visa |

August 1999

| < | | | | | | | > |
|---|---|---|---|---|---|---|---|
| | 1 | 2 | 3 | 4 | 5 | 6 | 7 |
| | 8 | 9 | 10 | 11 | 12 | 13 | 14 |
| | 15 | 16 | 17 | 18 | 19 | 20 | 21 |
| | 22 | 23 | 24 | 25 | 26 | 27 | 28 |
| | 29 | 30 | 31 | | | | |

TRANSACTION PROCESSING USING INTERMEDIATE SERVER ARCHITECTURE

BACKGROUND OF THE INVENTION

1. Field of the Invention

The present invention relates to transaction processing.

2. State of the Art

Transaction processing using a point-of-sale (POS) terminal is well-known. Other types of transactions may be non-financial. In the area of physical security, for example, terminals may be used by patrolmen to check in, producing evidence of their having been in the required place at the required time. Terminals may also be used in the healthcare industry, for example, to produce a record of what medical personnel have attended a patient at what times, or for myriad other purposes. Transaction processing is used generally herein to refer to the use of a transaction terminal to read, and possibly to write, a record-bearing medium such as a credit card, an ID card, a smart card, etc. The transaction terminal may use a contact or a contactless reading mechanism. In the case of smart cards, for example, a contactless radio interface of a type known in the art may be used.

The present invention will be described largely in terms of POS transactions, since this type of transaction is most familiar.

The approval and "settlement" process for POS transactions involves various parties and various steps. Briefly, the transaction terminal receives card data and purchase amount data and sends it through a communications network to a transaction processing center ("transaction processor," "front-end processor," or "processor"). The transaction processing center switches the transaction to an association (e.g., Visa, Mastercard, etc.) acting on behalf of an issuing bank. Assuming that the transaction is authorized by or on behalf of the issuing bank, an authorization message is sent back through the transaction processing center and the communications network to the transaction terminal. If the transaction is authorized, "capture" follows in which information from the successful authorization is used to charge the authorized amount of money to the card. If goods are returned after the transaction has been captured, a "credit" is generated.

Settlement involves a merchant bank and an acquiring bank. The merchant bank has contracted with the merchant to enable the merchant to accept card transactions. The acquiring bank processes merchants's card transactions through the financial network on behalf of merchant banks (although in some instances the acquiring bank and the merchant bank may be the same). During settlement, captures and credits, usually accumulated into a "batch," are submitted from the merchant to the transaction processing center and on to the issuing and acquiring banks. As part of the settlement process, a "direction letter" may be sent to the U.S. Federal Reserve's Automated Clearing House (ACH) network, advising it as to what debits and credits need to occur in order to complete the transactions in the batch. The card issuer is debited the amount of the sale and the merchant's acquiring bank is credited a like amount. The merchant's acquiring bank then credits the merchant's checking account for the amount of the sale less any fees the merchant has agreed to pay for such service.

Referring to FIG. 1, in the past, transaction terminals have typically been connected through a dial-up connection, through the PSTN (public switched telephone network) to a packet switched data network (e.g., an X.25 network) to a transaction processor. The transaction processor is connected in turn to various issuers (e.g., Visa, Mastercard, Discover, etc.) and to various acquiring banks.

Recently, a transaction terminal has been introduced that has a wireless modem—in particular a CDPD (cellular digital packet data) modem—that may be used to establish a connection to a CDPD network, bypassing the PSTN with its accompanying delays and charges. Such an arrangement is shown in FIG. 2. The transaction terminal connects wirelessly to a wireless network such as a CDPD network. The CDPD network includes multiple Mobile Data Base Stations (MDBS) connected to a Mobile Data Intermediate Station (MDIS). The MDIS is connected to a transaction processor via a Frame Relay connection. Frame Relay is used because it is much faster than an X.25 connection.

The system of FIG. 2 suffers various disadvantages. In general, the system does not scale well to meet the needs of "distributed commerce" (or "mobile commerce"). Distributed commerce may be distinguished from e-commerce by a greater element of human involvement. Hence, whereas in e-commerce goods or services are ordered and paid for on-line, in distributed commerce, goods or services may be ordered in person and paid for by tender of a credit card or other non-cash payment medium, as opposed to the submission by the consumer (e.g., Web submission) of credit card information or the like. Examples of distributed commerce include such things as flagging a cab and, at the desired destination, paying by credit card, or phoning in an order for pizza and, at the time of delivery, paying by credit card. Other examples of distributed commerce include quick service restaurants, taxi and limousine services, delivery-based businesses, stadium concessions, stand-alone kiosks, and mobile businesses generally.

Like e-commerce, underlying characteristics of distributed commerce should be user convenience, greater satisfaction of demand, and vendor efficiency. However, various impediments hamper distributed commerce. Whereas the "plumbing" for e-commerce (i.e., the Web) has become almost universally established, the plumbing for distributed commerce remains ad hoc. A vendor must invest in terminal equipment and terminal software/firmware, enter into a subscription agreement with a wireless carrier, and, perhaps most importantly, ensure that a transaction processor is capable of receiving transactions through the wireless infrastructure, or is willing to invest to create such wireless capability. In the prior art system of FIG. 2, for example, transaction processors are typically not equipped to handle Frame Relay traffic, requiring that a new "front end" be provided.

Furthermore, a vendor's equipment, representing a substantial investment, may rapidly become obsolete. That is, in FIG. 2, because intelligence is "hardwired" into the transaction terminals, the transaction terminals themselves must be replaced, retrofitted or reprogrammed to accommodate new technologies (to accommodate ATM cards in addition to credit cards, to cite a historical example).

Also, in prior art systems, terminal management is cumbersome and labor-intensive. Activating or deactivating a terminal is typically a laborious paper-based process that takes days or weeks. Keeping transaction terminals up and running is also problematic. The only way for a malfunctioning terminal to be identified and fixed is for it to be reported by the merchant, in response to which a service call is scheduled. Except in the most trivial cases, service usually entails replacing the transaction terminal and sending the faulty unit to a service center.

Moreover, in prior art systems, reporting is paper-based at intervals (e.g., monthly) in a fixed (not customizable) format.

Furthermore, today's hard-wired transaction terminals are relatively inefficient in their use of bandwidth.

Hence, although distributed commerce, like e-commerce, should be characterized by efficiency, flexibility and adaptability to rapid change, presently it is not.

What is needed, then, is a flexible distributed commerce system architecture that is highly efficient, that readily allows for new services to be offered, and that accommodates the existing transaction processor infrastructure.

SUMMARY OF THE INVENTION

The present invention, generally speaking, provides a scalable distributed commerce system architecture for transaction processing. The distributed commerce system takes advantage of the wireless infrastructure and the Web infrastructure to provide the capabilities of distributed (mobile) commerce along with many of the benefits of e-commerce. Preferably, the system is based on open standards, making possible ubiquitous "any-to-any-to-any" transaction processing in which any compliant transaction terminal can communicate over any suitable wireless carrier and engage any transaction processor to successfully complete a wireless transaction. With the proliferation of wireless technologies, wireless transaction processing is expected to offer high-speed, reliable data transport, lower terminal costs, and lower wireless service costs (as compared to land-line charges). An important feature of the system is that an intermediate server receives data from a transaction terminal and processes the data. The processed data may then be forwarded to a transaction processor. The intermediate server may perform various types of processing, for example data format conversion, protocol conversion, etc. The server also makes possible various "value added services," e.g., ATM services, e-mail advertising services, customer attrition prevention services, customized reporting services, frequency and loyalty programs, etc. By linking the server to the Web, distributed commerce is able to incorporate the defining attributes of e-commerce, i.e., user convenience, greater satisfaction of demand, vendor efficiency and massive scalability. Parties using the system are able to obtain desired information in real time and take action (e.g., activate and deactivate terminals) in near-real time. The intermediate server makes possible the use of a "soft" transaction terminal, i.e., a "thin-client" (or pseudo thin-client) transaction terminal whose characteristics are determined in large part by the server. Tools are provided to effectively and efficiently manage provisioning, diagnostics, and reporting via a Web browser, enabling merchant acquires and card processors a fast and easy way to offer and manage a wireless transaction processing program with no systems development.

BRIEF DESCRIPTION OF THE DRAWING

The present invention may be further understood from the following description in conjunction with the appended drawing. In the drawing:

FIG. 4 is a screen display showing a transaction reporting feature of the system of FIG. 3.

DETAILED DESCRIPTION OF THE PREFERRED EMBODIMENTS

Figure 3:
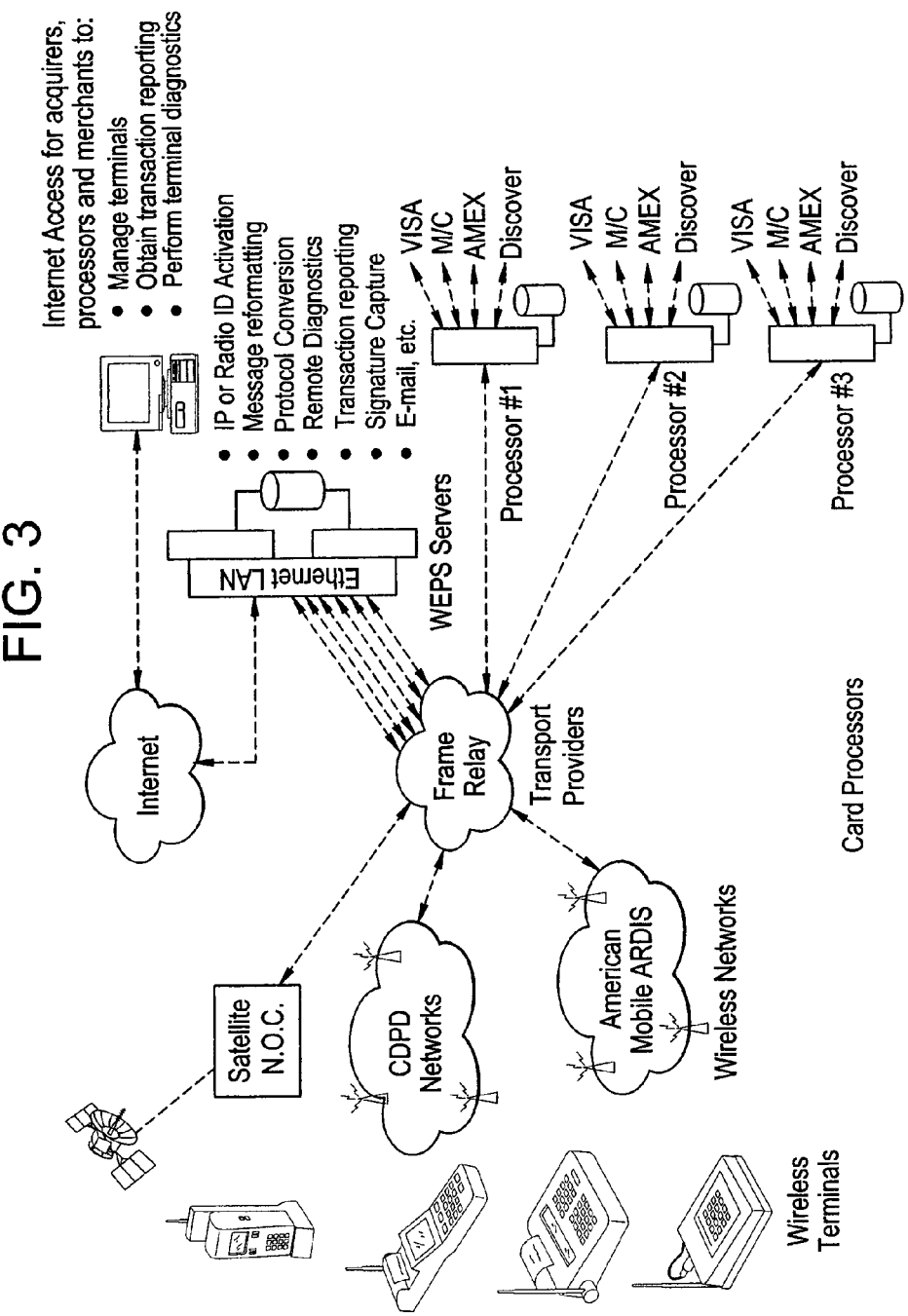
FIG. 3 is a block diagram of a transaction processing network using a wireless access point and an intermediate server in accordance with one embodiment of the present invention.

Referring now to FIG. 3, a block diagram is shown of a distributed commerce system in accordance with one embodiment of the present invention. The distributed commerce system is exemplified by the Wireless Express Payment Service (WEPS™) network of the present assignee.

The WEPS network links together wireless terminals, WEPS servers, and transaction processor servers via established transport providers. WEPS servers are in turn linked to customers (e.g., acquirers, processor, and merchants) via the Internet. Collectively, the WEPS servers function as a value added translation gateway, enabling any supported terminal to engage in a transaction with any supported transaction processor.

The WEPS network is device neutral and supports all (or at least the most popular) wireless terminals (e.g., Intellect 9770, Lipman 2090, Keycorp K78, Tranz Enabler, etc.). Wireless terminals communicate via wireless networks, e.g., CDPD networks (AT&T, BAM, GTE, Ameritech, etc.), the American Mobile ARDIS network, BellSouth, etc. Currently, different wireless networks lead the market in different regions of the U.S. However, with the proliferation of wireless technologies, options for wireless communication will continue to multiply. The WEPS network is carrier neutral—i.e., a wireless terminal can use any desired wireless network to communicate to the WEPS servers through the established Wide Area Network communications infrastructure. Wireless coverage may be of world-wide scope using satellite communications. In FIG. 3 therefore, a satellite is illustrated as communicating with a satellite Network Operations Center (NOC) which in turn communicates with the established Wide Area Network communications infrastructure.

Although not illustrated in FIG. 3, wired transaction terminals may also access the WEPS network through an Internet Service Provider (ISP) or through any or various means, e.g., Internet telephony, etc. In this manner, merchant having wired transaction terminals obtain the benefit of value added services offered by WEPS.

Referring still to FIG. 3, wireless networks communicate with WEPS servers via established transport providers. WEPS servers communicate in turn with various transaction processors, again via established transport providers. As described in relation to the prior art, transaction processors are connected in turn to various issuers (e.g., Visa, Mastercard, Discover, etc.) and to various acquiring banks. In an exemplary embodiment, wired communications is provided between wireless networks, WEPS servers, and transaction processors using Frame Relay technology. Of course, the WAN "backbone" need not be wired (including optical) but, conceivably, may also be wireless.

Just as the WEPS network is device neutral and carrier neutral, the WEPS network is also transaction processor neutral—i.e., a transaction can be routed to any desired transaction processor, e.g., Paymentech, Nova, Maverick, Lynk Systems, First Data, Global/NDC, Buypass/EPS, etc. A suite of connectivity programs is used to perform format and protocol conversion as necessary between any supported terminal and any supported processor.

WEPS servers are situated at one or more data centers and, at each site, may reside on a Ethernet LAN or other local area network, forming an intranet. The WEPS system may be based on any suitable intranet architecture may be two-tier, three-tier, etc. The servers are connected to a relational database management system (RDBMS) such as Oracle, for example. The database stores information for individual transaction terminals, identifying the type of terminal, the processor for that terminal, an appropriate connectivity program for enabling communication between the terminal and the transaction processor, etc. This information constitutes a terminal "profile." As described more fully hereinafter, the database also stores for transaction terminals thin-client "source programming," e.g., menu prompts, information to be printed, etc.

In addition to translation gateway services (i.e., any necessary message reformatting and protocol conversion), the WEPS servers perform other value added services such as terminal activation (IP activation in the case of CDPD, Radio ID activation in the case of ARDIS), remote diagnostics, transaction reporting, signature capture, e-mail, etc. Much of the power of the WEPS systems derives from databasing transaction processing information and, in a secure manner, making that information available to the "owners" of that information in real time via the Web, and from providing terminal deployment and management capabilities via the Web. These purposes are accomplished by connecting the WEPS servers to the Internet and providing a suite of database-driven Web tools. These tools may be custom tools, commercially-available tools, or a combination of both. To provide custom reporting capabilities, for example, a commercially-available tool, Crystal Reports, available from Seagate Software, may be used. Internet access allows acquirers, processors and merchants to manage terminals, obtain transaction reporting information, perform terminal diagnostics, etc. FIG. 4 shows an exemplary screen display illustrating the transaction reporting feature.

In the WEPS system currently, terminal activation and deactivation typically require manual intervention by the wireless network operator. The WEPS server provides expedited messaging from the customer to the wireless network operator. In the future, tighter integration is expected to eliminate manual intervention entirely, resulting in entirely automated activation and deactivation.

Signature capture services enables the WEPS system to improve the chargeback and retrieval request management process that occurs when a cardholder disputes a charge on their statement by capturing and verifying signatures on wireless transactions. E-mail advertising provides a way for a merchant acquirer to quickly and effectively broadcast to merchants promotions about the acquirer's new products and supplies. The range of value added services that may be offered is unlimited.

Additional examples of WEPS value added services include ATM services, customer attrition prevention, and frequency and loyalty programs. Through ATM services, WEPS servers can provide transaction processing benefits and services to wireless ATM machines. In the case of customer attrition prevention, this service would require the merchant to contact their current acquirer in order to obtain certain password information that would allow the terminal to be switched to another processor. This authorization feature would notify the current acquirer about an unhappy merchant and give the acquirer the opportunity to resolve any problems. Given the intranet/Internet architecture of the WEPS system, incentive programs can be easily implemented at the POS terminal and processed by the WEPS system in order to encourage additional wireless transactions.

Apart from POS applications, the WEPS system has the capability to handle any transaction-based data from any wireless network. Thus, the system can accommodate non-payment applications such as medical claims processing, collecting and processing telemetry data for oil, gas and other meter reading applications, coupling dispatch and "panic button" communications with in-vehicle payment processing applications, etc.

In operation of the system of FIG. 3, in the case of POS transactions, a WEPS-certified wireless POS terminal transmits card data, merchant data and transaction amount data to the wireless network. The wireless network then forwards the data packets to a WEPS server, via frame relay for example. The WEPS server "looks" at the transaction (based on the terminal profile) and determines if protocol conversion, message reformatting, or any other data manipulation is required. If the data needs to be manipulated, the WEPS server performs such functions and then sends the resulting data to the designated transaction processor, again via frame relay for example. If no manipulation is required, the data is merely passed through the WEPS server "as is" in store-and-forward fashion. Whether the transaction needs manipulation or not, pertinent data is "stripped" and sent to the WEPS database, where real-time reports are created for the acquirer/merchant. These reports can be accessed on a real-time basis via any Web browser.

The transaction processor receives the transaction from WEPS, via frame relay for example, and switches it to the appropriate card issuer for authorization. Once authorized, the data packet (which now includes an authorization code) is sent back to the transaction processor, which then forwards it back to the WEPS server. If needed, the protocol conversion/reformatting manipulation process is reversed. The authorization code is added to the WEPS database, and the completed transaction data is sent back to the wireless terminal via frame relay (or other suitable transport mechanism) and the wireless network.

Figure 1:
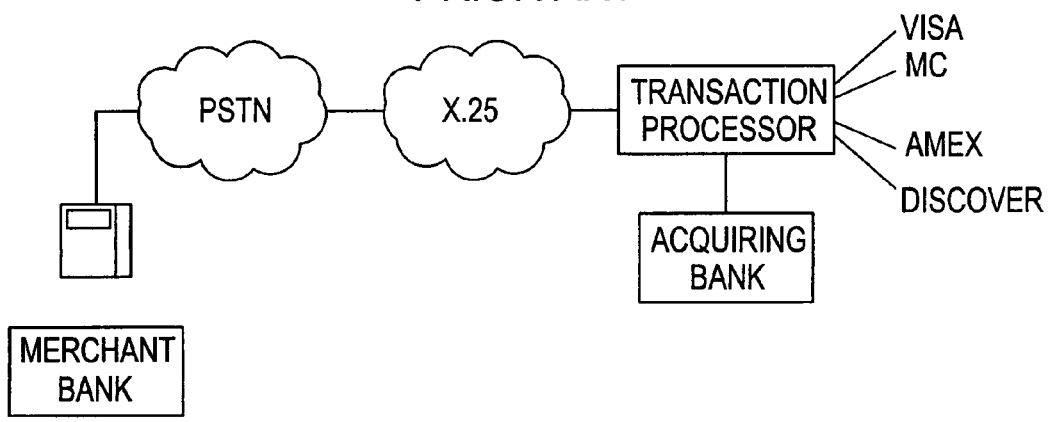
FIG. 1 is a block diagram of a conventional transaction processing network.
Figure 2:
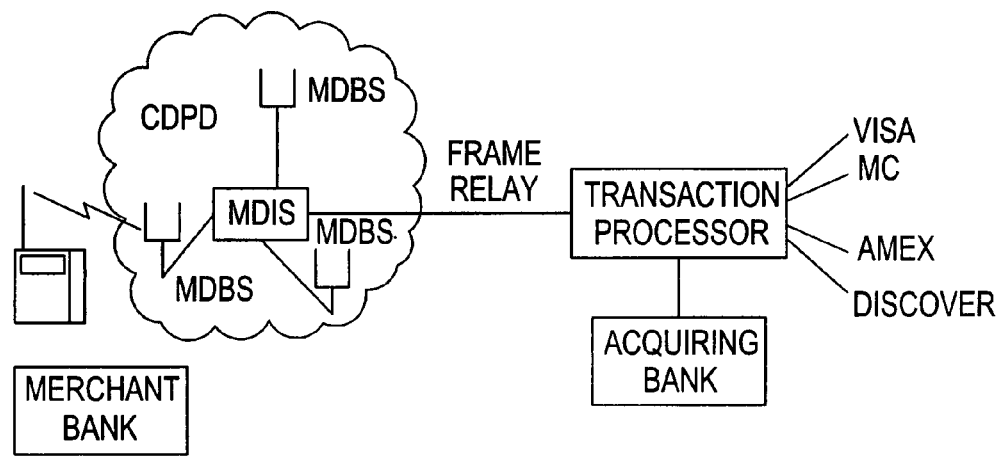
FIG. 2 is a block diagram of a known transaction processing network using a wireless access point.

The amount of data manipulation required by the WEPS system is dependent on the type of transaction terminal and the identity of the transaction processor. In the simplest case, as in FIG. 2, the transaction terminal and the transaction processor are capable of communicating "directly" with one another, i.e., through the combination of wireless and wired transport mechanism but without any translation. In this instance, the WEPS system simply operates in store-and-forward mode. A more difficult case is presented where the transaction terminal assumes one format (e.g., Global) but the transaction is to be routed to a transaction processor that uses a different format (e.g., Maverick). The Global and Maverick formats are described in Appendix A and Appendix B, respectively. In this instance, a first connectivity module (e.g., Global receive module) "parses" the incoming message into its constituent elements. A second connectivity module (e.g., Maverick send module) reassembles some or all of those elements, and possibly other elements stored in the WEPS database, into the appropriate format to send to the transaction processor for that transaction as indicated in the terminal profile stored in the WEPS database.

Message formatting by the server allows for low latency and fast response time. For example, the UDP communications protocol may be used on a network segment between the transaction terminal and the server. The UDP protocol is low overhead and therefore faster than more complex protocols such as X.25 or TCP. In addition, the server may store information about the various transaction terminals and use this information to "fill in" various information fields prior to transmission to the transaction processor across the second network segment. These fields need not be transmitted on the first network segment from the transaction processor to the server, resulting in higher-speed operation.

Because of the low latency between the transaction terminal and the server, the transaction terminal and the server can function as client/server. Client/Server is primarily a relationship between processes running on separate machines. The server process is a provider of services. The client is a consumer of services. In essence, client/server provides a clean separation of function based on the idea of service.

In the context of a transaction processing system, adherence to a client/server model provides several important advantages. The transaction terminal, instead of being a fairly sophisticated computer, can instead be a relatively "dumb" terminal, relying on the server for "transaction intelligence." A great economy is therefore achieved. Of perhaps even more importance, adaptability is achieved. Changes to transaction intelligence can be deployed in one place, on the server, without requiring field modifications to an installed base of transaction terminals.

"Thin client," in one sense, implies a dumb terminal that operates in request/reply mode. In the case of a transaction terminal, data representing hardware inputs would be mapped to corresponding replies. For example, in response to an initial card swipe (request), the reply from the server might be "ENTER AMOUNT," and so forth. In the case of a transaction terminal running off of line power, such an arrangement would be satisfactory (assuming communications latency were sufficiently low to avoid user irritation). In the case of a battery-power transaction terminal, however, such a true thin-client mode of operation consumes excessive power.

In an exemplary embodiment, a thin-client specification for WEPS compliant terminal devices is provided. Terminal devices manufacturers desiring to take advantage of the powerful features of the WEPS system can do so by making their terminal equipment WEPS compliant. The specification standardizes the terminal device message format, and over time (as the proportion of WEPS compliant terminals increases) is expected to greatly simplify the translation function required to be performed by the WEPS server.

The WEPS thin-client specification provides for one or both of a "pseudo" thin-client mode of operation and a true thin-client mode of operation. Where both modes are provided, two separate "menus" are defined, mapping hardware inputs to corresponding replies. A first menu governs operation in pseudo thin-client mode. In this mode, replies are downloaded from the server in advance and stored locally in the transaction terminal. Hence, in response to a card being swiped, instead of transmitting card data immediately to the server and waiting for the server's reply, such as "ENTER AMOUNT," the terminal device retrieves the reply (previously downloaded from the server) from its own local memory. This manner of operation preserves the battery life of the transaction terminal. The "reply" may be output to a display, output to a printer, used to control some aspect of terminal operation, etc.

Despite the menu and replies being stored in the transaction terminal, no loss of flexibility is suffered—the menu can be changed at any time by the server establishing a connection with the terminal and sending new menu information. A routine within the terminal parses the new menu information and stores various menu elements in appropriate locations within a non-volatile (NV) memory (e.g., flash memory) of the terminal. Note that menu information is defined on a per terminal basis. Thus, in the case of a large merchant having a large number of terminals within different departments, the terminals may all be of the same type—(or may be of different types)—but the programs of those terminals may vary from department to department, for example.

A second (presumably less-used) menu governs operation in true thin-client mode. In this mode, responses are not stored locally but are sent through the network from the server. This arrangement avoids incurring the cost of local NV storage for lesser-used options.

Figure 5:
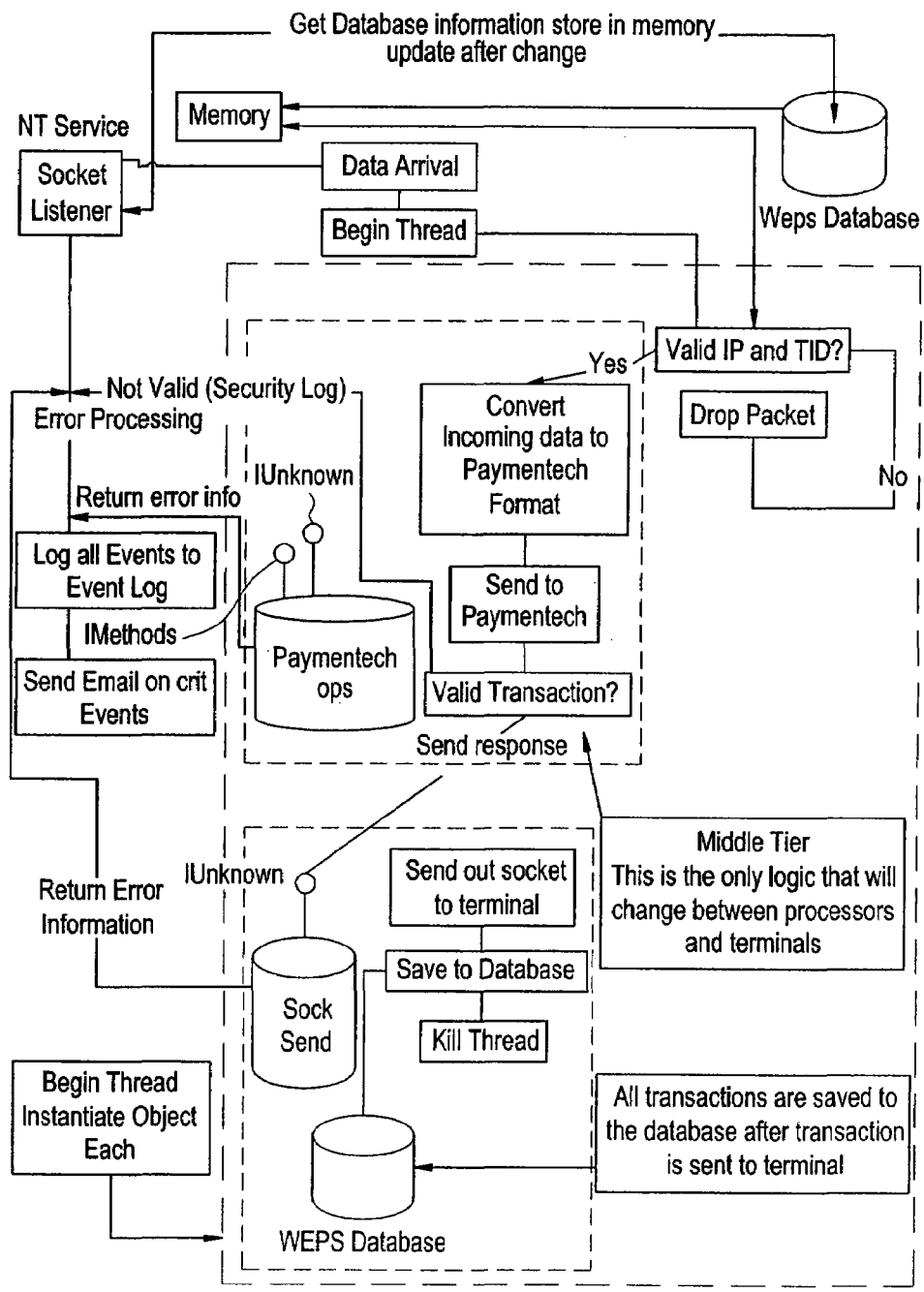
FIG. 5 is a diagram illustrating a card processor software architecture that may be used in the system of FIG. 3.

Referring to FIG. 5, the architecture of card processor software that may be used in the system of FIG. 3 is shown. In an exemplary embodiment, the software is service-based. A socket listener service listens for messages from terminal devices. When the service is begun, database information is stored in memory to enable rapid processing. Changes in the data cause the database to be updated.

When a message is received (DATA ARRIVAL), an execution thread is begun (BEGIN THREAD), causing objects (in this example, COM objects) to be instantiated for the purpose of processing the message. First, the IP address/terminal ID (TID) is validated against the database information stored in memory. If the IP/TID is not valid, then the packet is dropped. Otherwise, an object is invoked to perform conversion of the data to the appropriate format based on the terminal profile.Depending on which transaction processor is designated, a corresponding conversion object is invoked In the illustrated example, Paymentech is assumed to be the transaction processor of choice. Therefore, the incoming data is converted to Paymentech format and sent to Paymentech. A card validation process ensues, involving, e.g., Paymentech and one or more other downstream processors (e.g., Visa).

If validation fails, then error processing ensues in which an entry is created in an error log. The error log may be set up to send email notification of critical events.

If validation succeeds, an object is invoked to send back to the terminal a validation response in the appropriate format. Latency is reduced by saving response information to the database only after the response has been sent to the terminal. The execution thread is then killed.

If an error occurs during the course of sending the response back to the terminal, then error information is returned and logged in the event log.

As has been detailed in the foregoing description, the present transaction processing system provides for ubiquitous "any-to-any-to-any" wireless (as well as wired) transaction processing capability, enabling penetration of new markets such as fast food, mobile merchants, transportation, etc. The resulting mobility and flexibility allows business to be conducted anywhere, with fast transaction times and savings in communication costs. Wireless access may occur through any wireless data network. The system inter-operates with an unlimited variety of wireless terminal equipment, including handheld units, countertop units, mobile units and new high speed terminal devices. Application flexibility is provided through the use of a thin-client or pseudo thin-client application in the terminal devices. Web accessibility allows for easy terminal set-up, on-line activation and provisioning, remote diagnostic capabilities, and real-time transaction reporting, in addition to myriad other value added card services. The system is always on-line, allowing for real-time, up-to-the-minute reporting capability.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of transaction processing, comprising:
operating a wireless transaction terminal in a first mode, wherein during a transaction, communication of any transaction information with a first server is delayed;
alternately operating the transaction terminal in a second mode, wherein communication of the transaction information with the first server is not delayed;
accessing a wireless communications network and sending first transaction information for a transaction from the transaction terminal across the communications network;
receiving and processing the first transaction information at the first server;
storing at least a portion of the first transaction information; and
the first server sending second transaction information based on the first transaction information to a transaction processor.

2. The method of claim 1, wherein in the first mode of operation, transaction process replies for use during a transaction are downloaded to the transaction terminal prior to the transaction and/or in the second mode of operation, transaction process replies for using during a transaction are communicated to the transaction terminal during the transaction.

3. The method of claim 1, wherein the first server controls information stored on the transaction terminal.

4. The method of claim 1, wherein the first transaction information is transported to the server using a first protocol, and the second transaction information is transported to the transaction processor using a second different protocol.

5. The method of claim 4, wherein the first protocol has lower overhead than the second protocol.

6. The method of claim 1, wherein the first transaction information is in a first format, and the second transaction information is in a second different format, and wherein the method further comprises the server reformatting the first transaction information from the first format to the second transaction information in the second format.

7. The method of claim 1, wherein the server accesses information about the transaction terminal to use for reformatting the first transaction information from the first format to the second transaction information in the second format.

8. The method of claim 1, further comprising generating a report of transaction information from one or more transactions conducted on the transaction terminal, wherein the report is accessible via the Internet.

9. The method according to claim 1, further comprising the server receiving transaction approval information from the transaction processor and then forwarding all or a portion of the transaction approval information to the transaction terminal.

10. The method according to claim 9, wherein the approval information comprises at least one of: a credit approval, a credit denial, an approval code, a reference code, credit account information and an amount for the transaction.

11. A transaction processing network, comprising:
a server;
a plurality of wireless transaction terminals, each operable in at least one of a first mode and a second mode, wherein in the first mode of operation, during a transaction, communication of any transaction information with the server is delayed and wherein during the second mode communication of the transaction information with the server is not delayed;
a first network segment linking one or more of the wireless transaction terminals to the server, wherein all or a portion of transaction information received from each transaction conducted on each of one or more transaction terminals is stored and made accessible via the Internet; and
a second network segment linking the server to one or more further destinations, wherein at least one of the further destinations comprise a transaction processor for obtaining transaction approvals.

12. The apparatus of claim 11, wherein the server controls the operation of one or more of the transaction terminals.

13. The apparatus of claim 12, wherein the operation comprises deactivation or activation of the transaction terminal.

14. The apparatus of claim 11, wherein transaction information comprises first transaction information which is transported across the first network segment using a first protocol, and wherein second transaction information based on the first transaction information is transported across the second network segment using a second different protocol.

15. The apparatus of claim 14, wherein the first protocol has lower overhead than the second protocol.

16. The apparatus of claim 14, wherein the first transaction information is in a first format, and the second transaction information is in a second different format, and wherein the server reformats the first transaction information form the first format to the second transaction information in a second format.

17. The apparatus of claim 16, wherein the server accesses information about a transaction terminal which forwarded first transaction information to reformat the first transaction information from the first format to the second transaction information in the second format.

18. A system for tracking transactions comprising:
a first server for receiving and processing first transaction information for a transaction received from a transaction terminal;
a wireless transaction terminal operable in at least one of a first mode and a second mode, wherein in the first mode of operation, during a transaction, communication of any first transaction information with the first server is delayed and wherein during the second mode communication of the first transaction information with the first server is not delayed;
a database for storing at least a portion of the first transaction information, wherein the stored transaction information is accessible via the Internet; and
a second server for obtaining transaction approval information for the transaction, the second server wherein
the second server receives second transaction information from the first server,
the second transaction information being based on the first transaction information,
the first server receives the transaction approval information from the second server and forwards all or a portion of the transaction approval information to the transaction terminal.

* * * * *